(12) United States Patent
Zhang et al.

(10) Patent No.: US 8,018,678 B1
(45) Date of Patent: Sep. 13, 2011

(54) METHOD FOR SIMULTANEOUS ELECTRONIC LAPPING GUIDE (ELG) AND PERPENDICULAR MAGNETIC RECORDING (PMR) POLE FORMATION

(75) Inventors: Jinqiu Zhang, Fremont, CA (US); Tsung Yuan Chen, San Jose, CA (US); Steven C. Rudy, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 491 days.

(21) Appl. No.: 12/324,442

(22) Filed: Nov. 26, 2008

(51) Int. Cl.
  *G11B 5/147* (2006.01)
(52) U.S. Cl. .............................. 360/125.03; 360/125.02
(58) Field of Classification Search ............. 360/125.03, 360/125.02, 125.3
  See application file for complete search history.

(56) References Cited

U.S. PATENT DOCUMENTS

| | | |
|---|---|---|
| 4,670,732 A | 6/1987 | Church |
| 4,675,986 A | 6/1987 | Yen |
| 5,065,483 A | 11/1991 | Zammit |
| 5,210,667 A | 5/1993 | Zammit |
| 5,597,340 A | 1/1997 | Church et al. |
| 6,027,397 A | 2/2000 | Church et al. |
| 6,193,584 B1 | 2/2001 | Rudy et al. |
| 6,347,983 B1 | 2/2002 | Hao et al. |
| 6,399,401 B1 | 6/2002 | Kye et al. |
| 6,532,646 B2 | 3/2003 | Watanuki |
| 6,609,948 B1 | 8/2003 | Fontana, Jr. et al. |
| 6,623,330 B2 | 9/2003 | Fukuroi |
| 6,699,102 B2 | 3/2004 | Reiley et al. |
| 6,728,067 B2 | 4/2004 | Crawforth et al. |
| 6,758,722 B2 | 7/2004 | Zhu |
| 6,857,937 B2 | 2/2005 | Bajorek |
| 6,884,148 B1 | 4/2005 | Dovek et al. |
| 6,950,289 B2 | 9/2005 | Lam et al. |
| 6,982,042 B2 | 1/2006 | Church et al. |
| 7,014,530 B2 | 3/2006 | Kasiraj et al. |
| 7,149,061 B2 | 12/2006 | Yamakura et al. |
| 7,206,172 B2 | 4/2007 | Ding et al. |
| 7,244,169 B2 | 7/2007 | Cyrille et al. |
| 7,245,459 B2 | 7/2007 | Cyrille et al. |
| 7,268,976 B2 | 9/2007 | Yamakura et al. |
| 7,271,982 B2 | 9/2007 | MacDonald et al. |
| 7,272,883 B2 | 9/2007 | Le et al. |
| 7,287,316 B2 | 10/2007 | Kasahara et al. |
| 7,333,300 B2 | 2/2008 | Church et al. |
| 7,359,152 B2 | 4/2008 | Matono et al. |
| 7,360,296 B2 | 4/2008 | Cyrille et al. |
| 7,393,262 B2 | 7/2008 | Biskeborn |
| 7,903,372 B2 * | 3/2011 | Lee et al. ................... 360/125.3 |
| 2004/0179310 A1 | 9/2004 | Lam et al. |
| 2005/0023673 A1 | 2/2005 | Nowak |
| 2006/0028770 A1 | 2/2006 | Etoh et al. |
| 2006/0044683 A1 | 3/2006 | Matono et al. |
| 2006/0103990 A1 | 5/2006 | Ito et al. |
| 2006/0126222 A1 | 6/2006 | Aoki et al. |
| 2007/0008660 A1 | 1/2007 | Yamakura et al. |
| 2008/0072418 A1 | 3/2008 | Kondo et al. |
| 2008/0144215 A1 | 6/2008 | Hsiao et al. |
| 2008/0297945 A1 * | 12/2008 | Han et al. ................... 360/125.3 |
| 2009/0097159 A1 * | 4/2009 | Otagiri et al. ............. 360/125.3 |

* cited by examiner

Primary Examiner — Tan T. Nguyen

(57) ABSTRACT

A method for providing a perpendicular magnetic recording (PMR) head is disclosed. The method comprises: providing a stop layer; providing an insulating layer over the stop layer; forming a pole trench in the insulating layer by performing a reactive ion etching (RIE) process in the insulating layer over the stop layer; forming an electronic lapping guide (ELG) in the insulating layer by performing the RIE process in the insulating layer over the stop layer; and providing a PMR pole in which at least a portion of the PMR pole resides in the pole trench.

20 Claims, 5 Drawing Sheets

METHOD FOR SIMULTANEOUS ELECTRONIC LAPPING GUIDE (ELG) AND PERPENDICULAR MAGNETIC RECORDING (PMR) POLE FORMATION

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

One example of a disk drive is a hard disk drive. A conventional hard disk drive includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider towards the surface of the disk, and when the disk rotates, air adjacent to the disk moves along with the surface of the disk. The slider flies over the surface of the disk on a cushion of the moving air.

When the slider rides on the air bearing, the write and read heads are employed for writing magnetic transitions to and reading magnetic transitions from the rotating disk. The read and write heads are connected to processing circuitry that operates according to a program to implement writing and reading functions.

Perpendicular magnetic recording (PMR) transducers are now being utilized to increase the data density of hard disk drives. Such perpendicular magnetic recording transducers record magnetic bits of a data in a direction that is perpendicular to the surface of the magnetic disk. A write head is used that generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic disk.

Thus, a conventional magnetic recording head may include a PMR transducer residing on the slider. As previously described, the slider also includes an air-bearing surface (ABS) that faces the disk. A conventional PMR transducer may include a PMR pole and a top shield separated by a write gap. The top shield may also act as a pole during writing. The conventional PMR pole may be surrounded by an insulating layer. Similarly, the top shield may also be surrounded by another insulating layer.

Magnetic recording heads are typically constructed upon a wafer, with thousands of such recording heads being constructed on a single wafer. To form a slider, a wafer is cut into rows of sliders, and then this row of sliders is lapped to form the air bearing surface (ABS). This lapping surface determines critical dimensions such as the height of the PMR pole. Unfortunately, lapping processes are difficult to control, especially at the accuracy needed for very small recording heads. In particular, PMR pole fabrication is a very critical and challenging manufacturing step.

Accordingly, there is a need for a process in which the electronic lapping guide (ELG) and the PMR pole are fabricated simultaneously to allow for tight control of PMR pole height.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, devices, procedures, components, electrical structures, circuits, etc., related to the fabrication of PMR transducers and PMR transducers themselves are not described in detail, or are shown in block diagram or reduced form, in order not to obscure the present invention.

Figure 1:
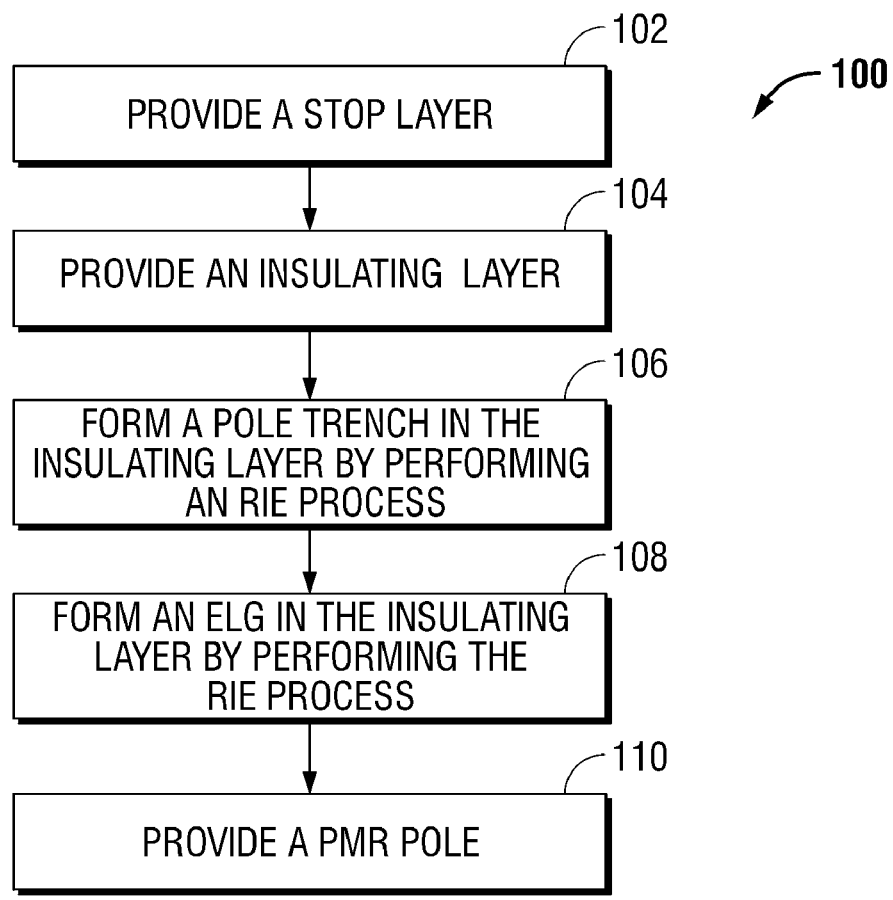
FIG. 1 is a flow chart illustrating a method to simultaneously form a pole trench and an electronic lapping guide (ELG), according to one embodiment of the invention.

FIG. 1 is a flow chart illustrating a method 100 to simultaneously form a pole trench and an electronic lapping guide (ELG), according to one embodiment of the invention. In one embodiment, process 100 may be utilized to form a PMR transducer. For simplicity, some steps may be omitted. The PMR transducer being fabricated may be part of a merged head that also includes a read head (not shown) along with other known elements, that reside on the slider (not shown.) Method 100 is described in the context as providing a single PMR transducer. However, method 100 may be used to fabricate multiple transducers at substantially the same time.

To begin with, a stop layer is provided (block 102). For example, the stop layer may be formed of a Cr or NiCr or Ru material. Next, an insulating layer is provided over the stop layer (block 104). In one embodiment, the insulating layer may be an alumina insulating layer such as an $Al_2O_3$ insulating layer.

A pole trench is then formed in the insulating layer by performing a reactive ion etching (RIE) process in the insulating layer over the stop layer (block 106). Further, an electronic lapping guide (ELG) is formed in the insulating layer by performing the RIE process in the insulating layer over the stop layer (block 108). The pole trench and the ELG may be formed simultaneously. Further, later in process 100, a PMR pole may be provided (block 110) as well as a write gap and a top shield. The PMR pole may reside in a portion of the pole trench. In this way, a PMR transducer may be formed.

Figure 2:
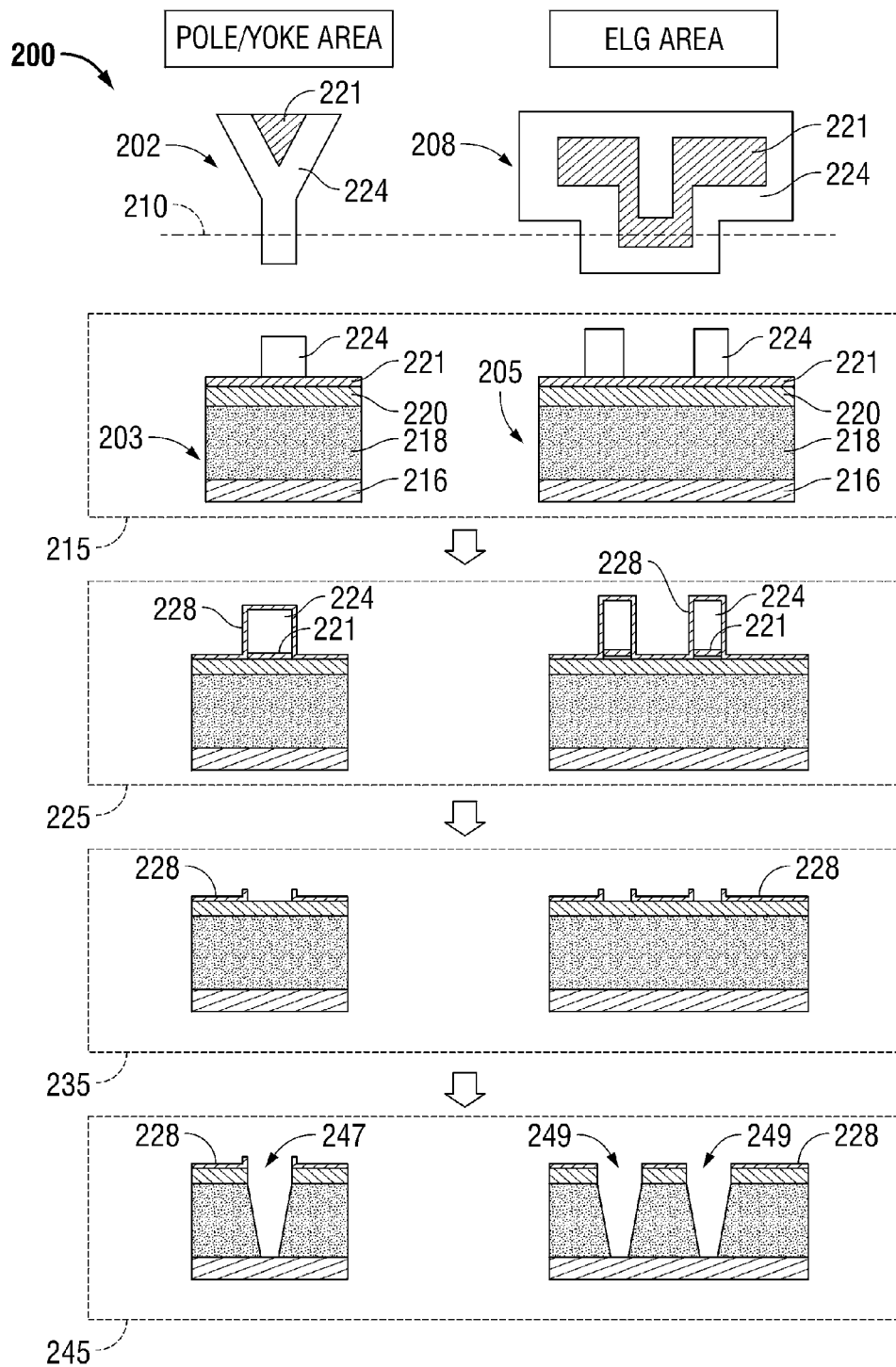
FIG. 2 is a diagram illustrating top views of the pole/yoke area and the electronic lapping guide (ELG) area and cross-sectional views of the pole/yoke area and the ELG area and illustrates steps to simultaneously form the pole trench and the ELG trench, according to one embodiment of the invention.

Turning now to FIG. 2, FIG. 2 is a diagram 200 illustrating top views of the pole/yoke area 202 and the electronic lapping guide (ELG) area 208 and cross-sectional views of the pole/yoke area 203 and the ELG area 204, taken along line 210, in order to illustrate steps (215, 225, 235, and 245) to simultaneously form the pole trench and the ELG trench, according to one embodiment of the invention.

In particular, looking at step 215 showing cross-sectional views of the pole/yoke area and the ELG area 203 and 205, it can be seen that the pole and ELG are formed by a Cr or NiCr or Ru reactive ion etching (RIE) stop layer 216, an alumina insulating layer 218 formed over the insulating layer (such as $Al_2O_3$), a Ta layer 220 formed over the alumina insulating layer 218 and a photoresist line pattern 221 formed on top of the Ta layer 220 by a traditional photolithography process. Further, a triangular-shaped photoresist line pattern 221 is formed on the yoke area 202 and a photoresist line pattern 221 is formed on the ELG to outline the ELG structure. Additionally, photoresist material 224 is used to cover the pole/yoke area 202 and the ELG area 228.

As shown at step 225, a bottom anti-reflective coating (BARC) reactive ion etching (RIE) process may be performed to remove sections of the photoresist line pattern 221 and a NiFe hard mask material 228 may be deposited on the pole area 203 and the ELG area 205.

Next, at step 235, ion milling may be used to remove portions of the hard mask material 228 and the photoresist material 234 is then lifted off.

Then, at step 245, an $Al_2O_3$ reactive ion etching (RIE) process is performed to simultaneously create a pole trench area 247 and a plurality of ELG trench areas 249. Advantageously, these trench areas have very similar slope.

As previously described, a line-trench photopattern is simultaneously used for ELG trench formation in the same process for pole trench formation for the write pole such that the upper edge of the ELG is formed by the equivalent edge of the image which defines the nose. This guarantees ELG build-up is in a self-aligned process.

Figure 3:
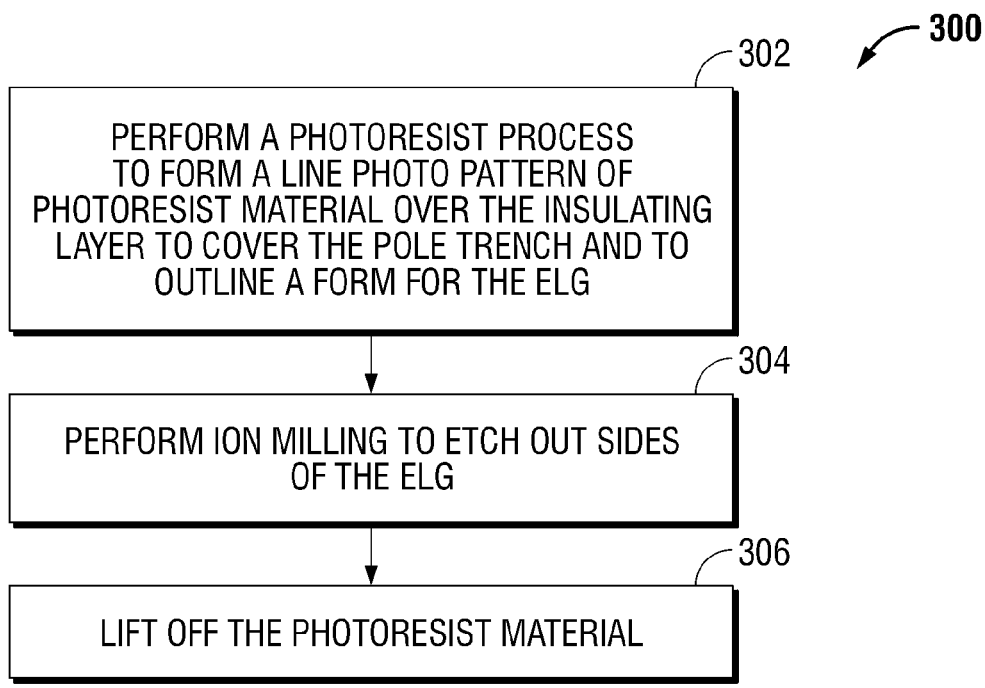
FIG. 3 is a flow chart illustrating a method to etch out sides of the electronic lapping guide (ELG), according to one embodiment of the invention.

Turning now to FIG. 3, FIG. 3 is a flow chart illustrating a method 300 to etch out sides of the electronic lapping guide (ELG), according to one embodiment of the invention. In particular, a photoresist process is performed to form a line photo pattern of photoresist material over the insulating layer to cover the pole trench and to outline a form for the ELG (block 302). Next, ion milling is performed to etch out sides of the ELG (block 304). Lastly, the photoresist material is lifted off (block 306).

Figure 4:
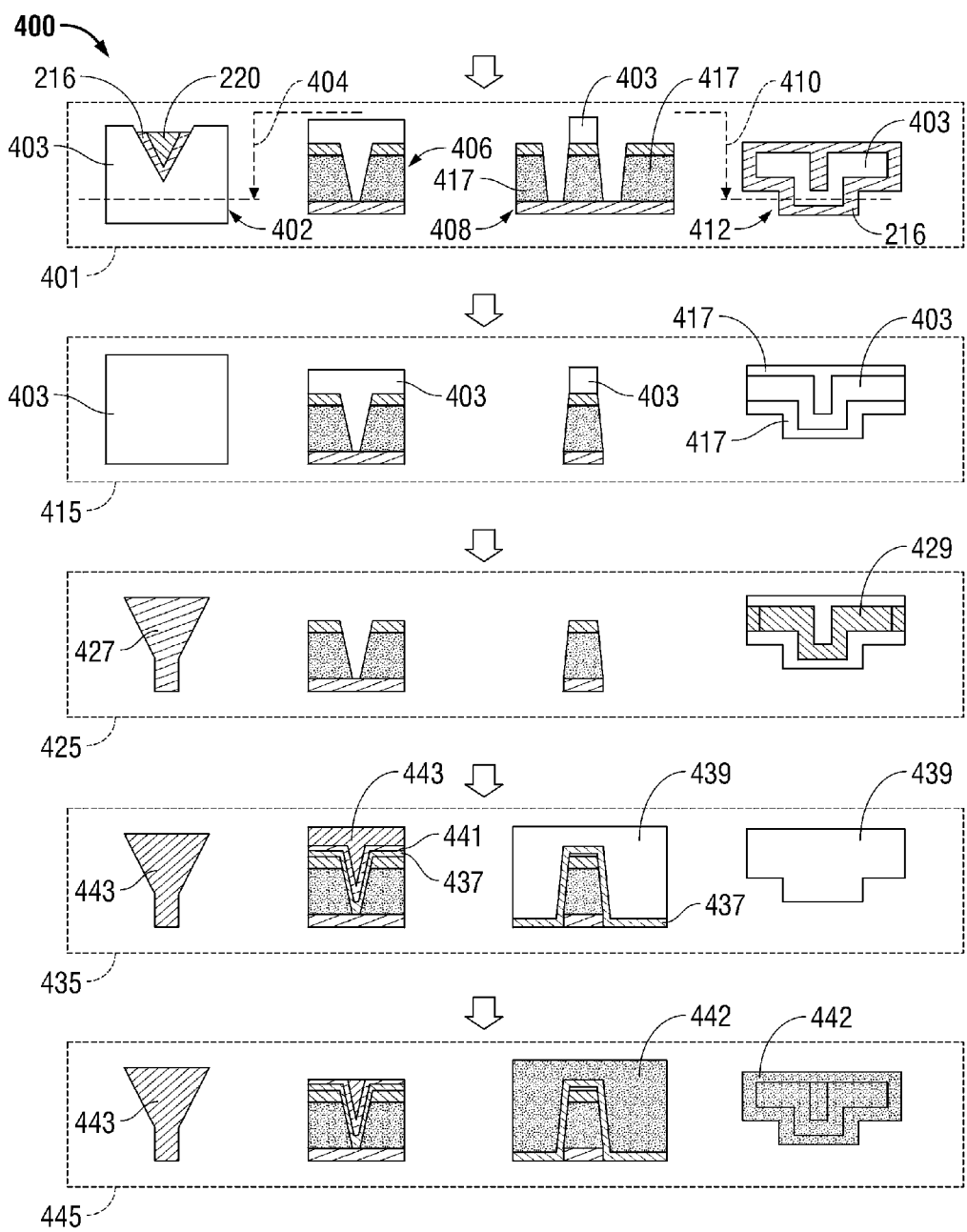
FIG. 4 is a diagram illustrating top views of the pole/yoke area and the ELG area and cross-sectional views of the pole/yoke area and the ELG area and illustrates steps to etch out sides of the ELG, according to one embodiment of the invention.

Turning now FIG. 4, FIG. 4 is a diagram 400 illustrating top views of the pole/yoke area 402 and the ELG area 412 and cross-sectional views of the pole/yoke area 406 and the ELG area 408 in order to illustrate steps (415, 425, 435, and 445) to etch out sides of the ELG, according to one embodiment of the invention. At step 401, wet etching is used to remove the RIE hard mask material (NiFe) 228 and a photoresist process is performed to cover the pole/yoke area 402 and ELG area 412 with photoresist material 403 to prevent etching. In particular, a photopattern of photoresist material is formed over the insulating layer to cover the pole trench and to outline a form for the ELG.

Next, at step 415, photoresist material 403 is used again to cover the pole/yoke area and a portion of the ELG area whereas ion milling is used to etch out sides 417 of the ELG area. In particular, ion milling is used to etch out the Cr exposed outside the ELG area. So only a remaining ELG pattern remains after ion milling. Then, at step 425, the photoresist material is lifted off. A chrome covered pole/yoke area 427 and a Ta covered ELG area 429 remain.

At step 435, an atomic layer deposition (ALD) material 437 is deposited across the whole wafer. Further, the ELG area is covered by photoresist 439 to prevent seed deposition and plating. Next, a seed layer 441 (e.g. Ru) is deposited over the pole/yoke area and then plating 443 is used to cover the pole/yoke area.

Then, at step 440, the photoresist material is lifted off of the ELG and $Al_2O_3$ 442 is deposited over the ELG area. Then, chemical mechanical polishing (CMP) may be performed.

By utilizing the previously-described process, a line-trench photopattern is simultaneously used for ELG trench formation in the same process for pole trench formation for the write pole such that the upper edge of the ELG is formed by the equivalent edge of the image which defines the nose. This guarantees ELG build-up occurs in a self-aligned process. As is known, PMR pole fabrication is a critical and challenging manufacturing step. In this way, in order to control the final slider lapping process, the writer ELG is prepared with the pole fabrication at the same time such that the lapping process can be controlled by using the ELG as a reference. Thus, a process is provided in which the ELG and PMR pole are fabricated simultaneously to allow for the tight control of PMR pole height.

Figure 5:
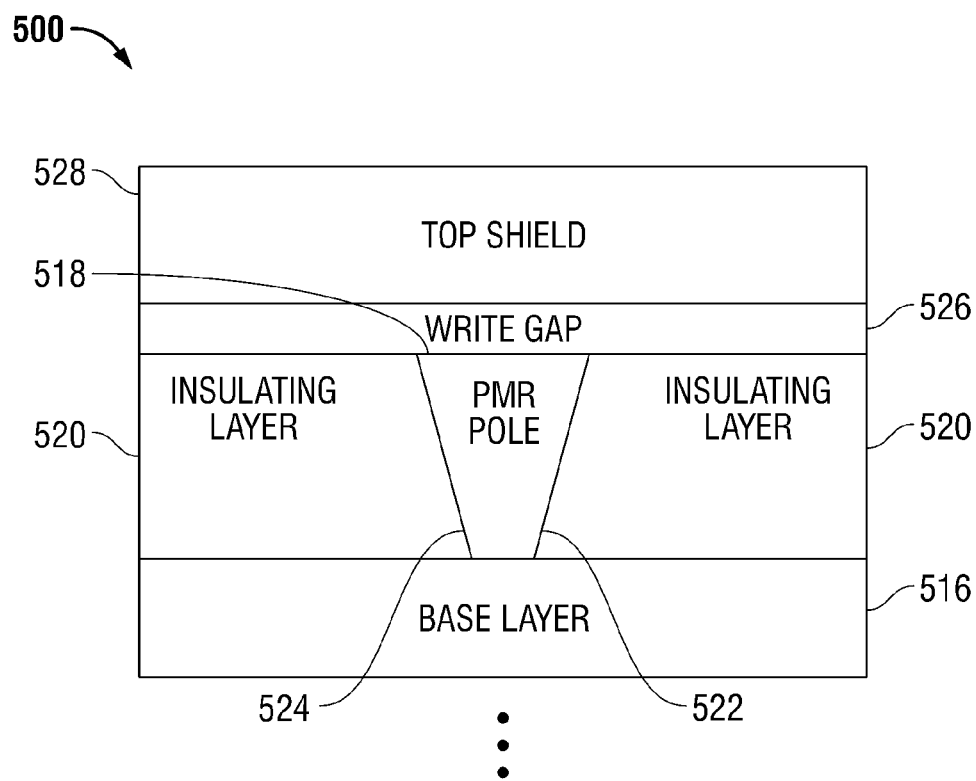
FIG. 5 illustrates a portion of a PMR transducer as viewed toward the air-bearing surface (ABS) that may be formed by the previously-described processes.

With reference now to FIG. 5, FIG. 5 illustrates a portion of a PMR transducer 500 as viewed toward the air-bearing surface (ABS) that may be formed by the previously-described processes. In particular, PMR transducer 500 may include a base layer 516, an alumina insulating layer 520 having a PMR pole 518 formed with embodiments of the previously-described invention, a write gap 526, and a top shield 528. In particular, PMR pole 518 may have sidewalls 522 and 524. These sidewalls 522 and 524 may be formed as part of the pole trench forming operations previously described.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for providing a perpendicular magnetic recording (PMR) head comprising:
   providing a stop layer;
   providing an insulating layer over the stop layer;
   forming a pole trench in the insulating layer by performing a reactive ion etching (RIE) process in the insulating layer over the stop layer;
   forming an electronic lapping guide (ELG) in the insulating layer by performing the RIE process in the insulating layer over the stop layer; and
   providing a PMR pole, at least a portion of the PMR pole residing in the pole trench.

2. The method of claim 1 wherein the pole trench and the ELG are formed simultaneously.

3. The method of claim 1 wherein the stop layer includes at least one of Cr, NiCr, and Ru.

4. The method of claim 1 further comprising:
   performing a photoresist process to form a line photo pattern of photoresist material over the insulating layer to cover the pole trench and to outline a form for the ELG;
   performing ion milling to etch out sides of the ELG; and
   lifting off the photoresist material.

5. The method of claim 4 further comprising performing wet etching to remove a hard mask material from the pole trench and the ELG.

6. The method of claim 4 wherein the insulating layer includes at least alumina.

7. The method of claim 6 wherein the RIE process to form the pole trench and the ELG is an alumina RIE process.

8. The method of claim 1 further comprising:
providing a write gap on the PMR pole; and
providing a top shield on at least the write gap.

9. A method for providing a perpendicular magnetic recording (PMR) head comprising:
providing a stop layer including at least one of Cr, NiCr, and Ru;
providing an insulating layer over the stop layer including at least alumina;
forming a pole trench in the insulating layer by performing a reactive ion etching (RIE) process in the insulating layer over the stop layer;
forming an electronic lapping guide (ELG) in the insulating layer by performing the RIE process in the insulating layer over the stop layer, wherein the pole trench and the ELG are formed simultaneously; and
providing a PMR pole, at least a portion of the PMR pole residing in the pole trench.

10. The method of claim 9 further comprising:
performing a photoresist process to form a line photo pattern of photoresist material over the insulating layer to cover the pole trench and to outline a form for the ELG;
performing ion milling to etch out sides of the ELG; and
lifting off the photoresist material.

11. The method of claim 10 further comprising performing wet etching to remove a hard mask material from the pole trench and the ELG.

12. The method of claim 10 wherein the insulating layer includes at least alumina.

13. The method of claim 12 wherein the RIE process to form the pole trench and the ELG is an alumina RIE process.

14. The method of claim 9 further comprising:
providing a write gap on the PMR pole; and
providing a top shield on at least the write gap.

15. A perpendicular magnetic recording (PMR) head comprising:
a stop layer;
an insulating layer formed over the stop layer;
a pole trench formed in the insulating layer by performing a reactive ion etching (RIE) process in the insulating layer over the stop layer;
an electronic lapping guide (ELG) formed in the insulating layer by performing the RIE process in the insulating layer over the stop layer, wherein the pole trench and the ELG are formed simultaneously; and
a PMR pole, at least a portion of the PMR pole residing in the pole trench.

16. The PMR head of claim 15 wherein the stop layer includes at least one of Cr, NiCr, and Ru.

17. The PMR head of claim 16 wherein a photoresist process is performed to form a line photo pattern of photoresist material over the insulating layer to cover the pole trench and to outline a form for the ELG, an ion milling process is performed to etch out sides of the ELG, and the photoresist material is lifted off.

18. The PMR head of claim 17 wherein the insulating layer includes at least alumina.

19. The PMR head of claim 18 wherein the RIE process to form the pole trench and the ELG is an alumina RIE process.

20. The PMR head of claim 15 further comprising:
a write gap formed over the PMR pole; and
a top shield formed over at least the write gap.

* * * * *